(12) United States Patent
Fountain

(10) Patent No.: US 8,596,611 B1
(45) Date of Patent: Dec. 3, 2013

(54) MOTORIZED PLATFORM HOIST APPARATUS

(76) Inventor: Eric Fountain, Belleville, MI (US)

( * ) Notice: Subject to any disclaimer, the term of this patent is extended or adjusted under 35 U.S.C. 154(b) by 583 days.

(21) Appl. No.: 12/780,477

(22) Filed: May 14, 2010

(51) Int. Cl.
*B66F 3/24* (2006.01)
*B60P 1/14* (2006.01)
*B60P 1/22* (2006.01)
*E04F 21/18* (2006.01)
*B62D 21/14* (2006.01)
*B62B 1/00* (2006.01)

(52) U.S. Cl.
USPC ......... 254/4 C; 254/4 R; 254/2 R; 280/43.12; 280/47.29; 280/47.34

(58) Field of Classification Search
USPC ...... 269/17; 254/2 R, 2 C, 4 C, 5 B, 6 B, 8 B, 254/10 B; 280/43.12, 47.29, 47.34, 79.11
See application file for complete search history.

(56) References Cited

U.S. PATENT DOCUMENTS

| | | | |
|---|---|---|---|
| 3,704,799 A * | 12/1972 | Morris, Jr. | 414/444 |
| 4,300,751 A | 11/1981 | Delaney | |
| D375,392 S | 11/1996 | Turnage et al. | |
| 6,010,299 A | 1/2000 | Jesswein | |
| 6,655,898 B1 * | 12/2003 | Liu-Barba et al. | 414/673 |
| 6,971,654 B2 * | 12/2005 | Amsili | 280/47.2 |
| 2001/0040233 A1 * | 11/2001 | Chamberlain | 254/4 R |
| 2003/0197351 A1 * | 10/2003 | Burger et al. | 280/651 |
| 2009/0047110 A1 | 2/2009 | Wilkie | |

* cited by examiner

*Primary Examiner* — Monica Carter
*Assistant Examiner* — Seahee Yoon

(57) ABSTRACT

The motorized platform lift apparatus provides an electromechanical personally sized lift and transport device for lifting objects and people safely. The remote control provides convenience as well as personal self-lift. The platform provides a superior lifting capability over typical forks. Moving parts are shielded and covered where possible to ensure safety. Lift rack tilt further enhances function as objects may be tilted back for most secure transport.

17 Claims, 4 Drawing Sheets

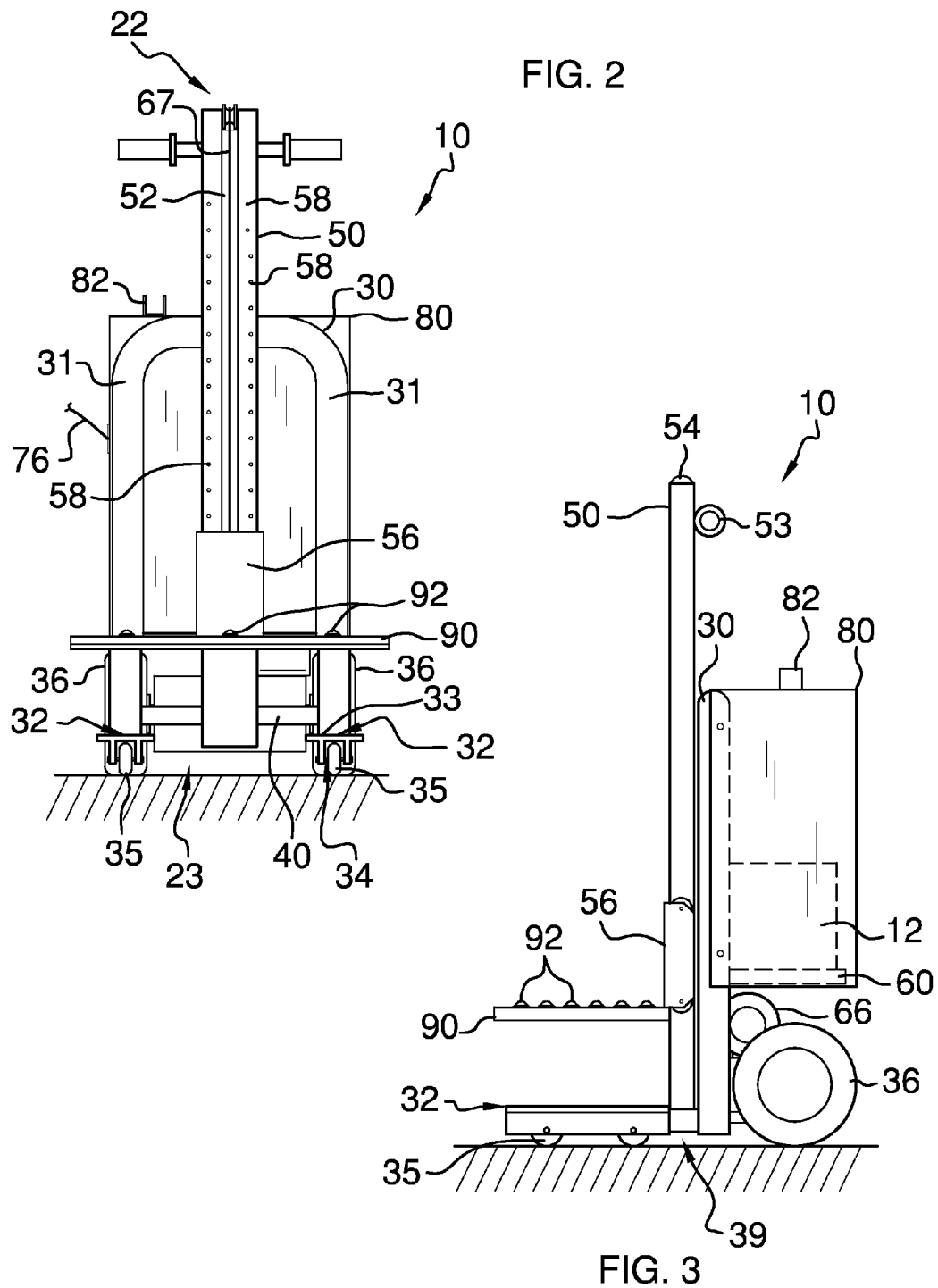

US 8,596,611 B1

MOTORIZED PLATFORM HOIST APPARATUS

BACKGROUND OF THE INVENTION

Various forklifts, hand trucks, and the like exist, and such devices are excellent for their designed uses in extremely heavy object transportation. Even similar devices designed for more personal, lighter weight object lift and transportation are available, but do not fully provide the convenience and operative functions of the present apparatus. By negating hydraulics, the present apparatus is devoid of the associated problems, such as excessive weight, and leaky seals and failed pressurized fittings, hoses, and cups. Further, the present apparatus provides a platform with rollers, rather than a pair of spaced apart lifting forks. The motorized apparatus provides lifting, lowering, and self-propulsion via battery power.

FIELD OF THE INVENTION

The motorized platform lift apparatus relates to lifts and hoists and more especially to an electrically powered personal sized platform lift apparatus that especially provides convenience in lifting and transporting objects that are at ground height, elevated heights, and positions there between.

SUMMARY OF THE INVENTION

The general purpose of the motorized platform lift apparatus, described subsequently in greater detail, is to provide a motorized platform lift apparatus which has many novel features that result in an improved motorized platform lift apparatus which is not anticipated, rendered obvious, suggested, or even implied by prior art, either alone or in combination thereof. To attain this, the motorized platform lift apparatus is provided in both basic and more complete forms. The frame may be u-shaped and tubular but may also be more basic. The stabilized forks may be fixed at approximately perpendicular to the frame or, in the more complete form, pivotally affixed. While a basic offering of the apparatus may feature exposed mechanical components, the ideal form recesses and covers components for both safety and for component preservation.

While all features of the apparatus are important to function, dependability, ease of operation, and safety, several features are even more so. The remote control provides for either use while affixed to the apparatus, or for user separation from the apparatus, whether for safety or convenience. The remote, for example, allows a user to stand on the platform and self-elevate for whatever reason, perhaps for changing light bulbs or storing items overhead. The platform rollers provide for easily loading and unloading of even heavy and awkward objects. The platform itself provides much more stable loading, unloading, and transport than do conventional forks only.

Fully electric and mechanical design and operation negates the problems that are often associated with hydraulics, and also avoids excessive weight which can also accompany hydraulically powered lifts and hoists.

Thus has been broadly outlined the more important features of the improved motorized platform lift apparatus so that the detailed description thereof that follows may be better understood and in order that the present contribution to the art may be better appreciated.

An object of the motorized platform lift apparatus is to provide electrical power.

Another object of the motorized platform lift apparatus is to provide self-propulsion.

A further object of the motorized platform lift apparatus is to provide for electrically lifting and lowering an object.

Another object of the motorized platform lift apparatus is to provide for safe self-lift of a person.

An added object of the motorized platform lift apparatus is to provide for counterbalancing a loaded object.

And, an object of the motorized platform lift apparatus is to provide mechanical rather than hydraulic operation.

Still another object of the motorized platform lift apparatus is to provide for carry a variety of shaped and sized objects.

Yet another object of the motorized platform lift apparatus is to provide remote control.

And, another object of the motorized platform lift apparatus is to provide for safe, guarded operation.

A further object of the motorized platform lift apparatus is to be compactly sized.

These together with additional objects, features and advantages of the improved motorized platform lift apparatus will be readily apparent to those of ordinary skill in the art upon reading the following detailed description of presently preferred, but nonetheless illustrative, embodiments of the improved motorized platform lift apparatus when taken in conjunction with the accompanying drawings.

In this respect, before explaining the current embodiments of the improved motorized platform lift apparatus in detail, it is to be understood that the motorized platform lift apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved motorized platform lift apparatus. It is therefore important that the claims be regarded as including such equivalent constructions insofar as they do not depart from the spirit and scope of the motorized platform lift apparatus. It is also to be understood that the phraseology and terminology employed herein are for purposes of description and should not be regarded as limiting.

BRIEF DESCRIPTION OF THE DRAWINGS

FIG. 2 is a front elevation view.
FIG. 3 is a lateral elevation view.

DETAILED DESCRIPTION OF THE DRAWINGS

With reference now to the drawings, and in particular FIGS. 1 through 7 thereof, the principles and concepts of the motorized platform lift apparatus generally designated by the reference number 10 will be described.

Figure 1:
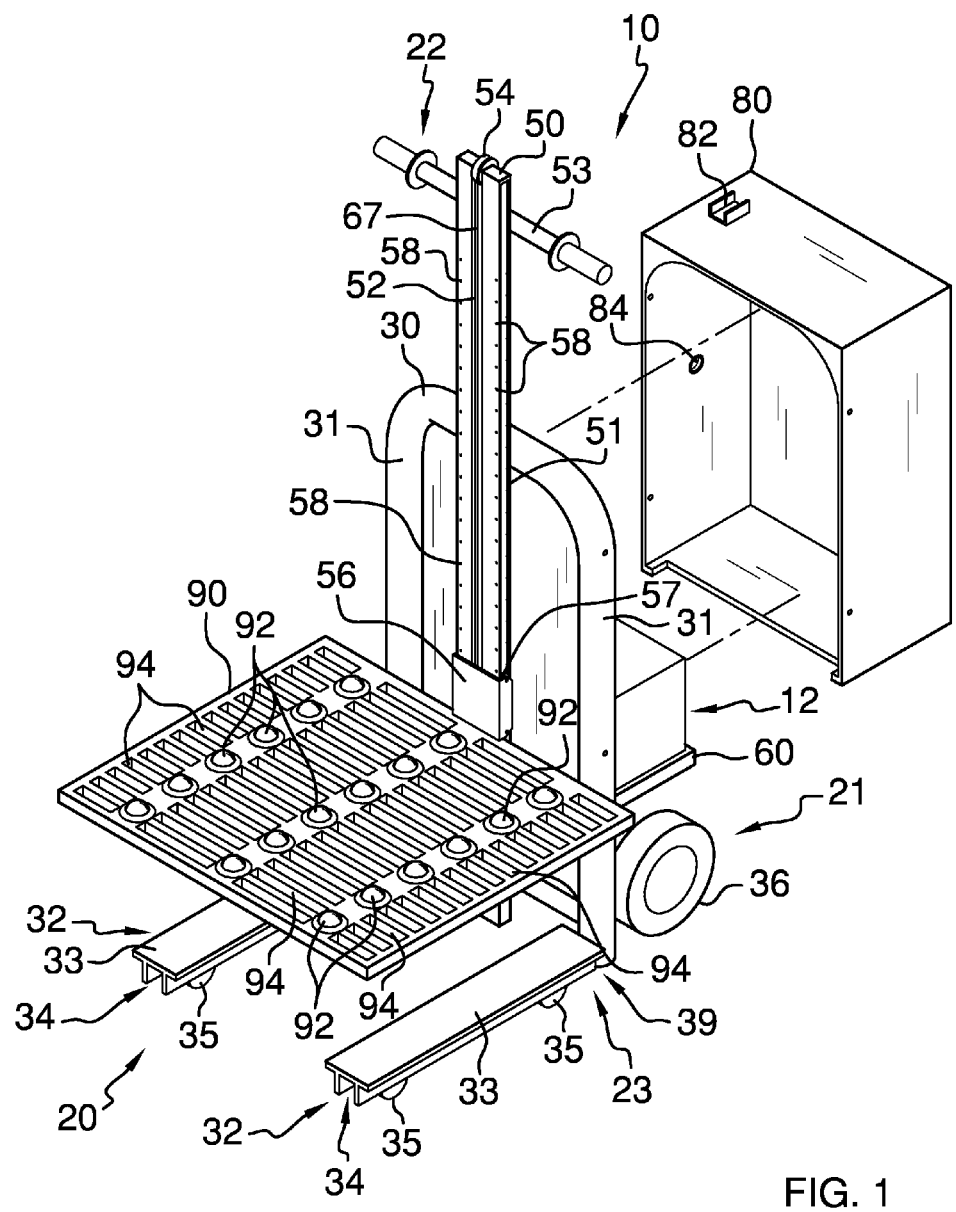
FIG. 1 is a frontal perspective view.
Figure 4:
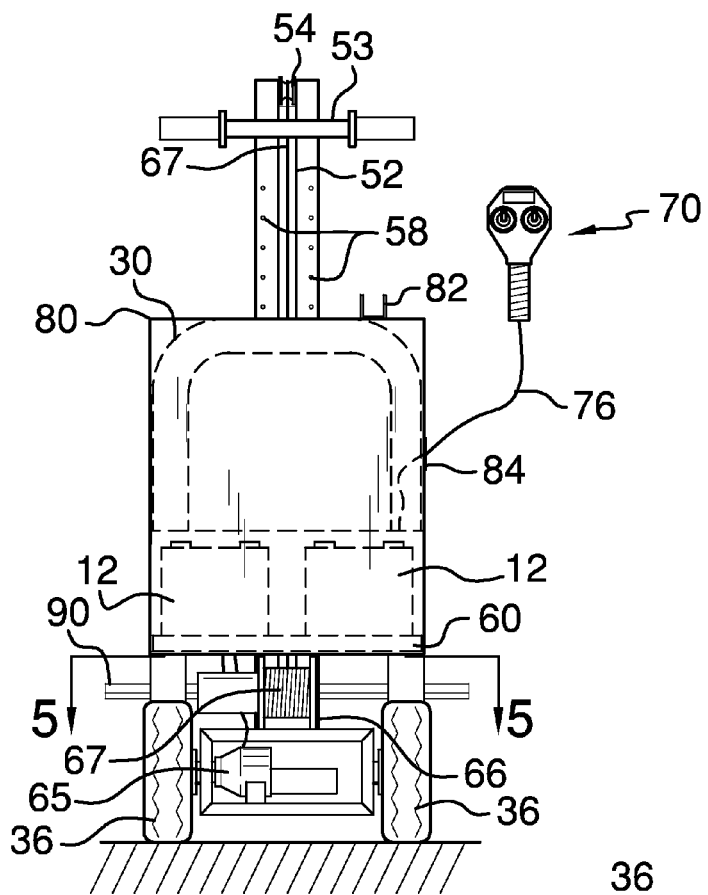
FIG. 4 is a rear elevation view.

Referring to FIG. 1, the apparatus 10 has a front 20 spaced apart from a rear 21 and a top 22 spaced apart from a bottom 23.

Referring to FIG. 2, the inverted u-shaped tubular frame 30 has a pair of spaced apart legs 31. The legs 31 are extended downwardly to proximal to the bottom 23.

Referring again to FIG. 1 and also to FIG. 3, the pair of stabilized forks 32 is provided. One of each of the forks 32 is pivotally affixed forwardly to one of each of the tubular frame 30 legs 31 via a pivotal attachment 39. Each fork 32 has a flat top 33 with a u-channel 34 extended downwardly therefrom. A pair of spaced apart small wheels 35 is disposed vertically within each stabilized fork 32 u-channel 34.

Referring to FIG. 4 and again to FIG. 1, a pair of spaced apart large wheels 36 is affixed rearwardly to and spaced apart from the u-shaped frame 30 legs 31 at the bottom 23. The large wheels 36 are joined by the axle 40.

Referring to FIG. 5 and again to FIG. 1, the lift rack 50 is affixed centrally and vertically to the u-shaped frame 30. The lift rack 50 is extended from proximal to the bottom 23 to the top 22.

Figure 7:
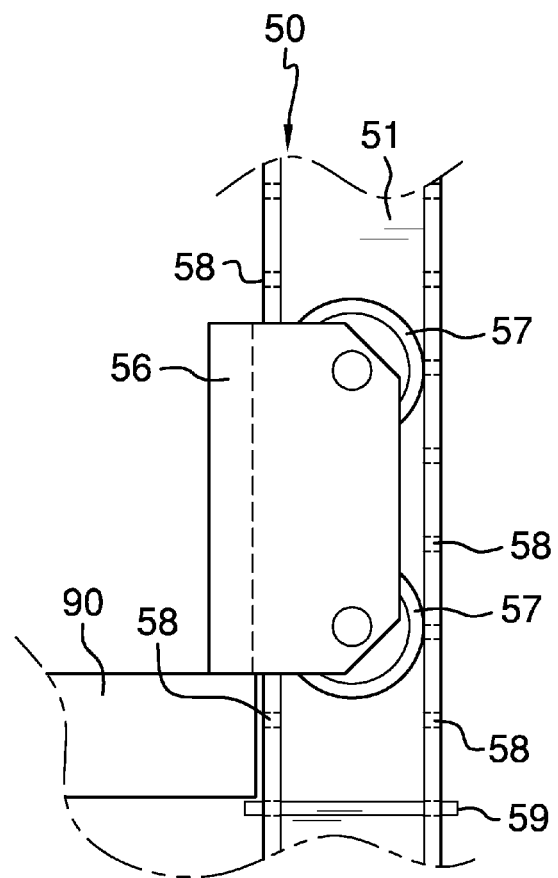
FIG. 7 is a lateral elevation view of the traveling block with block wheels within one wheel channel of the lift rack.

Referring to FIG. 7, the pair of spaced apart wheel channels 51 is disposed laterally within the lift rack 50.

Referring to FIG. 5 and again to FIGS. 1 and 2, the pair of cable channels 52 is disposed centrally and vertically within the lift rack 50. One cable channel 52 is disposed toward the rear 21 and one cable channel 52 is disposed toward the front 20. The pulley 54 is disposed within the lift rack 50 top 22. The cable 67 is recessively fitted within the cable channels 52. The horizontal handlebars 53 are disposed upwardly and rearwardly on the lift rack 50.

Referring to FIG. 4 and again to FIG. 3, the battery tray 60 is extended backwardly from the u-shaped frame 30. The battery tray 60 is proximal to the bottom 23. The battery tray 60 carries more than one existing battery 12.

Referring again to FIGS. 3, 4, and 5, the winch 66 is disposed between the u-shaped frame 30 legs 31. The cable 67 is disposed on and extended from the winch 66. The encased motor 65 is disposed between the u-shaped frame 30 legs 31 below the battery tray 60. The encased motor 65 is in communication with the winch 66, the pivotal attachments 39, the axle 40, and the batteries 12.

Figure 6:
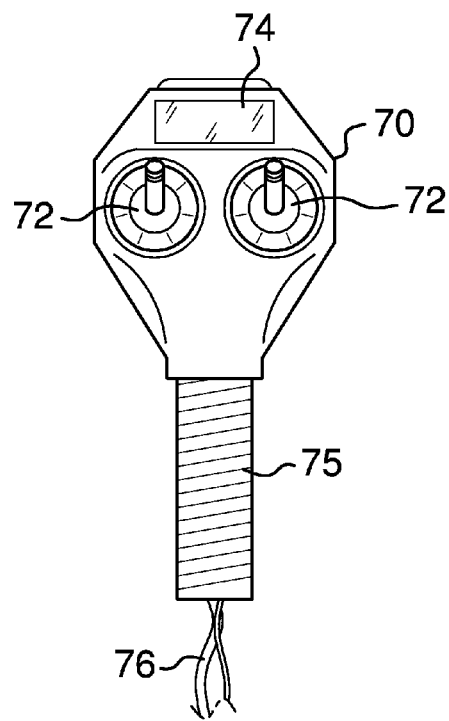
FIG. 6 is a front elevation view of the remote.

Referring to FIG. 6, the remote 70 is provided and is in communication with the encased motor 65, the winch 66, the pivotal attachments 39, and the batteries 12. Function controls 72 and LCD 74 are disposed within the handled 75 remote 70.

Figure 5:
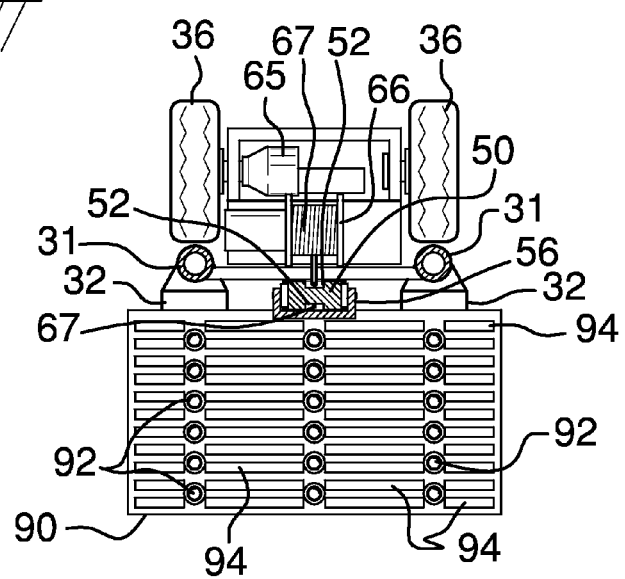
FIG. 5 is a top plan view with protective cover removed.

Referring to FIGS. 1, 2, and 5, the cable 67 is disposed around the winch 66, around the pulley 54, and within the cable channels 52.

Referring to FIG. 7, the traveling block 56 is movably disposed along the lift rack 50. The traveling block 56 is in communication with the cable 67. A quartet of block wheels 57 is provided. The block wheels 57 comprise two pair of block wheels 57. One of each of the pair of block wheels 57 is disposed in one of each of the wheel channels 51 of the lift rack 50. The traveling block 56 is moved from top 22 to bottom 23 of the lift rack 50 by the winch 66 via the cable 67.

Referring to FIGS. 1, 3, and 5, the rectangular platform 90 is extended perpendicularly forward from the traveling block 56. The plurality of spaced apart rollers 92 is disposed upwardly on the platform 90. The plurality of spaced apart slots 94 is disposed within the platform 90 and decreases platform 90 weight.

Referring again to FIGS. 1 and 3, the protective cover 80 is removably disposed over the u-shaped frame 30 and the battery tray 60. The grommeted hole 84 is disposed within the protective cover 80 to provide for wiring 76 passage. The remoter holder 82 is disposed outwardly on the cover 80. The remote holder 82 removably holds the remote 70.

Referring further to FIG. 7, the lift rack 50 importantly provides for safely retaining the traveling block 56 in an elevated position via orifices 58 and removable safety pin 59.

With respect to the above description then, it is to be realized that the optimum dimensional relationships for the parts of the encased motorized platform lift apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the motorized platform lift apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the motorized platform lift apparatus may be used.

Therefore, the foregoing is considered as illustrative only of the principles of the motorized platform lift apparatus. Further, since numerous modifications and changes will readily occur to those skilled in the art, it is not desired to limit the motorized platform lift apparatus to the exact construction and operation shown and described, and accordingly, all suitable modifications and equivalents may be resorted to, falling within the scope of the motorized platform lift apparatus.

What is claimed is:

1. A motorized platform hoist apparatus comprising, in combination:
    a front spaced apart from a rear, a top spaced apart from a bottom;
    a u-shaped frame extended downwardly to proximal to the bottom;
    a pair of stabilized forks affixed forwardly to the frame;
    a pair of spaced apart small wheels disposed vertically downwardly on each stabilized fork;
    a pair of spaced apart large wheels affixed rearwardly to the frame at the bottom, the large wheels joined by an axle;
    a lift rack affixed centrally and vertically to the frame, the lift rack extended from proximal to the bottom to the top;
    a pair of spaced apart wheel channels disposed laterally within the lift rack;
    a pulley disposed on the lift rack top;
    a handlebars disposed upwardly and rearwardly on the lift rack;
    a battery tray affixed to the u-shaped frame, the battery tray proximal to the bottom, the battery tray carrying more than a one existing battery;
    a winch disposed rearwardly on the frame;
    a motor disposed rearwardly and downwardly on the frame, the motor in communication with the winch, the axle, and the batteries;
    a remote in communication with the motor, the winch, and the batteries;
    a cable disposed around the winch and around the pulley;
    a traveling block movably disposed along the lift rack, the traveling block in communication with the cable;
    a quartet of block wheels, the block wheels comprising two pair of block wheels, one of each of the pair of block wheels disposed in one of each of the wheel channels of the lift rack;
    whereby the traveling block is moved from top to bottom of the lift rack by the winch via the cable;
    a rectangular platform extended perpendicularly forward from the traveling block;
    a control in communication with the batteries, the winch, and the motor.

2. The apparatus according to claim 1 wherein the motor is further an encased motor.

3. The apparatus according to claim 1 wherein the lift rack further comprises a pair of cable channels disposed centrally and vertically within the lift rack, one cable channel disposed toward the rear and one cable channel disposed toward the front, said cable movably disposed within the cable channels.

4. The apparatus according to claim 2 wherein the lift rack further comprises a pair of cable channels disposed centrally and vertically within the lift rack, one cable channel disposed toward the rear and one cable channel disposed toward the front, said cable movably disposed within the cable channels.

5. The apparatus according to claim 1 wherein a plurality of spaced apart rollers is further disposed upwardly on the platform;
a plurality of spaced apart slots disposed within the platform.

6. The apparatus according to claim 2 wherein a plurality of spaced apart rollers is further disposed upwardly on the platform;
a plurality of spaced apart slots disposed within the platform.

7. The apparatus according to claim 3 wherein a plurality of spaced apart rollers is further disposed upwardly on the platform;
a plurality of spaced apart slots disposed within the platform.

8. The apparatus according to claim 4 wherein a plurality of spaced apart rollers is further disposed upwardly on the platform;
a plurality of spaced apart slots disposed within the platform.

9. The apparatus according to claim 1 further comprising:
a protective cover removably disposed over the frame and the battery tray;
a remote holder disposed outwardly on the cover;
the remote removably disposed within the remote holder, the remote in communication with the batteries, the winch, and the motor.

10. The apparatus according to claim 2 further comprising:
a protective cover removably disposed over the frame and the battery tray;
a remote holder disposed outwardly on the cover;
the remote removably disposed within the remote holder, the remote in communication with the batteries, the winch, and the motor.

11. The apparatus according to claim 3 further comprising:
a protective cover removably disposed over the frame and the battery tray;
a remote holder disposed outwardly on the cover;
the remote removably disposed within the remote holder, the remote in communication with the batteries, the winch, and the motor.

12. The apparatus according to claim 4 further comprising:
a protective cover removably disposed over the frame and the battery tray;
a remote holder disposed outwardly on the cover;
the remote removably disposed within the remote holder, the remote in communication with the batteries, the winch, and the motor.

13. The apparatus according to claim 5 further comprising:
a protective cover removably disposed over the frame and the battery tray;
a remote holder disposed outwardly on the cover;
the remote removably disposed within the remote holder, the remote in communication with the batteries, the winch, and the motor.

14. The apparatus according to claim 6 further comprising:
a protective cover removably disposed over the frame and the battery tray;
a remote holder disposed outwardly on the cover;
the remote removably disposed within the remote holder, the remote in communication with the batteries, the winch, and the motor.

15. The apparatus according to claim 7 further comprising:
a protective cover removably disposed over the frame and the battery tray;
a remote holder disposed outwardly on the cover; and
the remote removably disposed within the remote holder, the remote in communication with the batteries, the winch, and the motor.

16. The apparatus according to claim 8 further comprising:
a protective cover removably disposed over the frame and the battery tray;
a remote holder disposed outwardly on the cover; and
the remote removably disposed within the remote holder, the remote in communication with the batteries, the winch, and the motor.

17. A motorized platform hoist apparatus comprising, in combination:
a front spaced apart from a rear, a top spaced apart from a bottom;
an inverted u-shaped tubular frame having a pair of spaced apart legs, the legs extended downwardly to proximal to the bottom;
a pair of stabilized forks, one of each of the forks pivotally affixed forwardly to one of each of the tubular frame legs via a pivotal attachment, each fork having a flat top with a u-channel extended downwardly therefrom;
at least a pair of spaced apart small wheels disposed vertically within each stabilized fork u-channel;
a pair of spaced apart large wheels affixed rearwardly to and spaced apart from the u-shaped frame legs at the bottom, the large wheels joined by an axle;
a lift rack affixed centrally and vertically to the u-shaped frame, the lift rack extended from proximal to the bottom to the top;
a plurality of spaced apart orifices disposed fore and aft in the lift rack;
a safety pin removably disposed within any of the orifices;
a pair of spaced apart wheel channels disposed laterally within the lift rack;
a pair of cable channels disposed centrally and vertically within the lift rack, one cable channel disposed toward the rear and one cable channel disposed toward the front;
a pulley disposed centrally within the lift rack top;
a horizontal handlebars disposed upwardly and rearwardly on the lift rack;
a battery tray affixed rearwardly and perpendicularly to the u-shaped frame, the battery tray proximal to the bottom, the battery tray carrying more than a one existing battery;
a winch disposed between the u-shaped frame legs;
an encased motor disposed between the u-shaped frame legs below the battery tray, the encased motor in communication with the winch, the pivotal attachments, the axle, and the batteries;
a remote in communication with the encased motor, the winch, the pivotal attachments, and the batteries;
a cable disposed around the winch, around the pulley, and within the cable channels;
a traveling block movably disposed along the lift rack, the traveling block in communication with the cable;
a quartet of block wheels, the block wheels comprising two pair of block wheels, one of each of the pair of block wheels disposed in one of each of the wheel channels of the lift rack;

whereby the traveling block is moved from top to bottom of the lift rack by the winch via the cable;

a rectangular platform extended perpendicularly forward from the traveling block;

a plurality of spaced apart rollers disposed upwardly on the platform;

a plurality of spaced apart slots disposed within the platform;

a protective cover removably disposed over the u-shaped frame and the battery tray;

a grommeted hole disposed within the protective cover;

a remote holder disposed outwardly on the cover, the remote holder removably holding the remote.

* * * * *